United States Patent
Mehta et al.

(10) Patent No.: US 11,836,590 B2
(45) Date of Patent: Dec. 5, 2023

(54) USER INTENT CLASSIFICATION USING A MULTI-AGENT REINFORCEMENT LEARNING FRAMEWORK

(71) Applicant: AI Netomi, Inc., San Mateo, CA (US)

(72) Inventors: Puneet Mehta, San Mateo, CA (US);
Shobhit Agrawal, Gurugram (IN);
Nishant Pandey, Gurugram (IN)

(73) Assignee: AI Netomi, Inc., San Mateo, CA (US)

( * ) Notice: Subject to any disclaimer, the term of this patent is extended or adjusted under 35 U.S.C. 154(b) by 887 days.

(21) Appl. No.: 16/702,039

(22) Filed: Dec. 3, 2019

(65) Prior Publication Data

US 2020/0184383 A1    Jun. 11, 2020

Related U.S. Application Data

(60) Provisional application No. 62/774,790, filed on Dec. 3, 2018.

(51) Int. Cl.
| | |
|---|---|
| *G06N 20/20* | (2019.01) |
| *G06F 40/284* | (2020.01) |
| *G06N 5/043* | (2023.01) |
| *G06N 3/04* | (2023.01) |
| *G06F 40/30* | (2020.01) |

(52) U.S. Cl.
CPC ........... *G06N 20/20* (2019.01); *G06F 40/284* (2020.01); *G06F 40/30* (2020.01); *G06N 3/04* (2013.01); *G06N 5/043* (2013.01)

(58) Field of Classification Search
None
See application file for complete search history.

(56) References Cited

U.S. PATENT DOCUMENTS

2017/0140755 A1* 5/2017 Andreas ................. G10L 25/51
2018/0330721 A1* 11/2018 Thomson ............ G10L 15/1822

OTHER PUBLICATIONS

Shama et al. ("Bayesian-Game-Based Fuzzy Reinforcement Learning Control for Decentralized POMDPs" 2012) (Year: 2012).*
Shah et al. ("Interactive reinforcement learning for task-oriented dialogue management" 2016) (Year: 2016).*

\* cited by examiner

*Primary Examiner* — Lut Wong
(74) *Attorney, Agent, or Firm* — Edward C. Kwok; VLP Law Group LLP

(57) ABSTRACT

Reinforcement learning is applied in a multi-agent environment to enable effective determination of user intent classification from documents (e.g., chat, emails or another mode of communication by a user). Although different agents may implement different learning algorithms, they communicate with each other to learn and adjust their behavior by observing peer agents. Using a reinforcement learning (RL) framework, a method integrates each agent's prediction of user intent, as a sequence of tokens in the document are being analyzed. The method continues to refine its observation until it reaches the end of the document. This approach is more effective in uncovering refined linguistic features of words in the document, when read sequentially from start to end.

12 Claims, 4 Drawing Sheets

USER INTENT CLASSIFICATION USING A MULTI-AGENT REINFORCEMENT LEARNING FRAMEWORK

CROSS REFERENCE TO RELATED APPLICATIONS

The present application relates to and claims priority of U.S. provisional patent application ("Provisional Application"), Ser. No. 62/774,790, entitled "User Intent Classification using a Multi-Agent Reinforcement Learning Framework," filed on Dec. 3, 2018. The disclosure of the Provisional Application" is hereby incorporated by reference in its entirety.

BACKGROUND OF THE INVENTION

1. Field of the Invention

The present invention relates to natural language processing (NLP) applications, such as recognizing a user's intent expressed in documents. In particular, the present invention relates to application to artificial intelligence or machine learning techniques in NLP applications.

2. Discussion of the Related Art

Performing user intent classification based on a text document is a topic of active research in NLP. A rich literature exists that describes machine learning (ML) algorithms for predicting the user intent. These ML algorithms vary significantly from one to another: some are based on features derived from experts (e.g. rule or bag of words-based classifiers), while others rely on automatic derivation of word embeddings and deep learning (DL). However, to automatically derive these features from text document, a DL-based algorithm requires a large quantity of data, take enormous amount of time to train the model and are not easy to interpret.

SUMMARY

According to one embodiment of the present invention, reinforcement learning is applied in a multi-agent environment to enable effective determination of user intent classification from documents (e.g., chat, emails or another mode of communication by a user). In this regard, although different agents may implement different learning algorithms, the agents may communicate with each other to learn from each other, and to adjust their behaviors from their observation of their peer agents. One example of these learning algorithms may be a machine learning (ML) algorithm that classifies a user intent based on multiple features derived from a document. Using a reinforcement learning (RL) framework, a method according to the present invention integrates each agent's prediction of user intent, as a sequence of tokens in the document are analyzed by the agents. The method continues to refine its observation until the end of the document is reached. This approach is believed more effective in uncovering refined linguistic features of words in the document, when read sequentially from start to end. The present invention also facilitates participation by human agents (HA) from, for example, crowdsourcing platforms, in the same environmental setting. With HA participation, the present invention allows non-human agents to learn and mimic human judgement in their identification of underlying user intent.

The present invention is better understood upon consideration of the detailed description below in conjunction with the accompanying drawings.

DETAILED DESCRIPTION OF THE PREFERRED EMBODIMENTS

Figure 1:
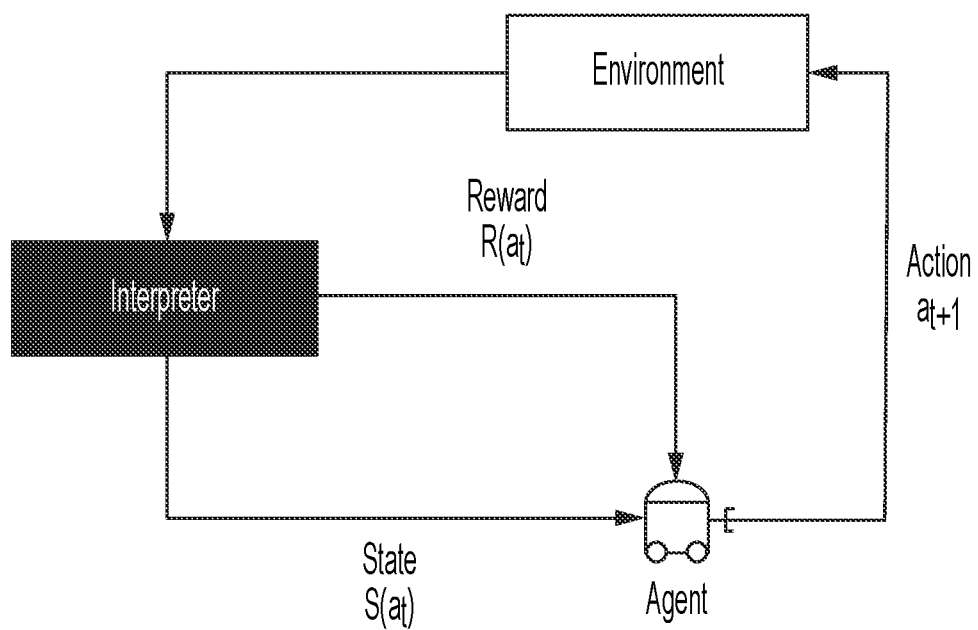
FIG. 1 illustrates the work flow in the learning architecture of the present invention when played with a single agent.

The present invention aims at providing an intent classification algorithm that is highly accurate, easy to interpret, trainable on small datasets and adaptive to user feed-backs. Based on reinforcement learning (RL), a method of the present invention enables non-human agents ("AI agents") to observe the sentence and to refine its prediction on each token of the sentence. In general, algorithmic complexity of a model directly correlates with the number of data points required to train the model and the sophistication of nuances that the model can find in the document. While less complex ML models may still be highly accurate, even with a smaller number of data points, such models are typically incapable of uncovering nuances in text from a linguistic perspective. Hence, the present invention uses multiple learning agents within an RL environment, in which each agent may use a different ML algorithm. Each agent can observe the performance of other agents on each token and contextual state, which allows each agent to adapt its behavior and to refine its future predictions. Note that, the RL environment of the present invention can accommodate human agents alongside machine agents, thereby enabling machine agents to observe human actions on a variety of tasks, allowing them to learn and to mimic human intelligence.

A learning system of the present invention may be modeled as a "learning architecture" in which one or more agents play multiple "games." (When more than one agent is involved, they are seen as playing the games against each other.) Each game may be characterized by:

a. an environment element that divides a document into multiple tokens and keeps track of a contextual historical state.

b. at each round of the game, each agent (say, agent i) receives from the environment a current token ($t_t$) and a current historical state ($s_t$). Based on these input items and agent i's own algorithm ("policy"), agent i provides an action $a_t^i$ (in this case, a current prediction ($b_t^i$) or "current bid"). The current bid may be expressed as a confidence vector (e.g., a probability distribution of the possible intents; for example, in a 2-intent scheme, a bid (0.6, 0.4) would represent a prediction of the first intent with a greater confidence of 0.6 over the second intent, which has a prediction with confidence 0.4).

c. based on the bids received, the environment generates (i) a current reward $r_t^i$, which is a metric for the quality of agent i's current bid, and (ii) a new historical state ($s_{t+1}$) as the current state and provides a new current token ($t_{t+1}$). Current reward $r_t^i$ may be calculated, for example, as a measure of the distance between the correct intent and the most likely intent, in view of the confidence assigned by agent i in its bid.

d. When the end of the document is reached, each agent's cumulative reward (i.e., the sum of the current rewards over all the rounds) indicates how accurate the agent's predictions. The agent may adapt its own policy to maximize a future cumulative reward. The final state indicates the intent collectively derived from the predictions of all the agents.

FIG. 1 illustrates the work flow in the learning architecture of the present invention when played with a single agent. In FIG. 1, the environment element is shown divided into "Environment" and "Interpreter." The function of the Interpreter is to generate the current reward to each agent and the new contextual historical state.

In one embodiment, the contextual states represent a sequential pass over the words in a given document. At any round or time point t, the current state $s_t$ is represented jointly by an embedding of the current word $E_{w,t}$ and a embedding of historical state $E_{s,t}$, which is defined by all previously seen words.

$$s_t = f(E_{w,t}, E_{s,t})$$

As mentioned above, in accordance with the present invention, each agent may have a different policy. This policy may be predefined for the agent by an expert or be learnt iteratively based on training data (i.e., the rewards received in the games). To maximize reward, a well-trained agent should not put any preference for any specific intent in a state when no specific information for intent has been indicated. For example, if the tokens in an utterance received so far form "I want to" or "I am" (the underlined word being the current token), no specific intent has been indicated. On the contrary, states with key words, such as "I want to cancel," "what is the status" likely provides important information regarding the intent of the utterance, the agent should provide bids reflective of preference for the likely intent or intents.

Figure 2:
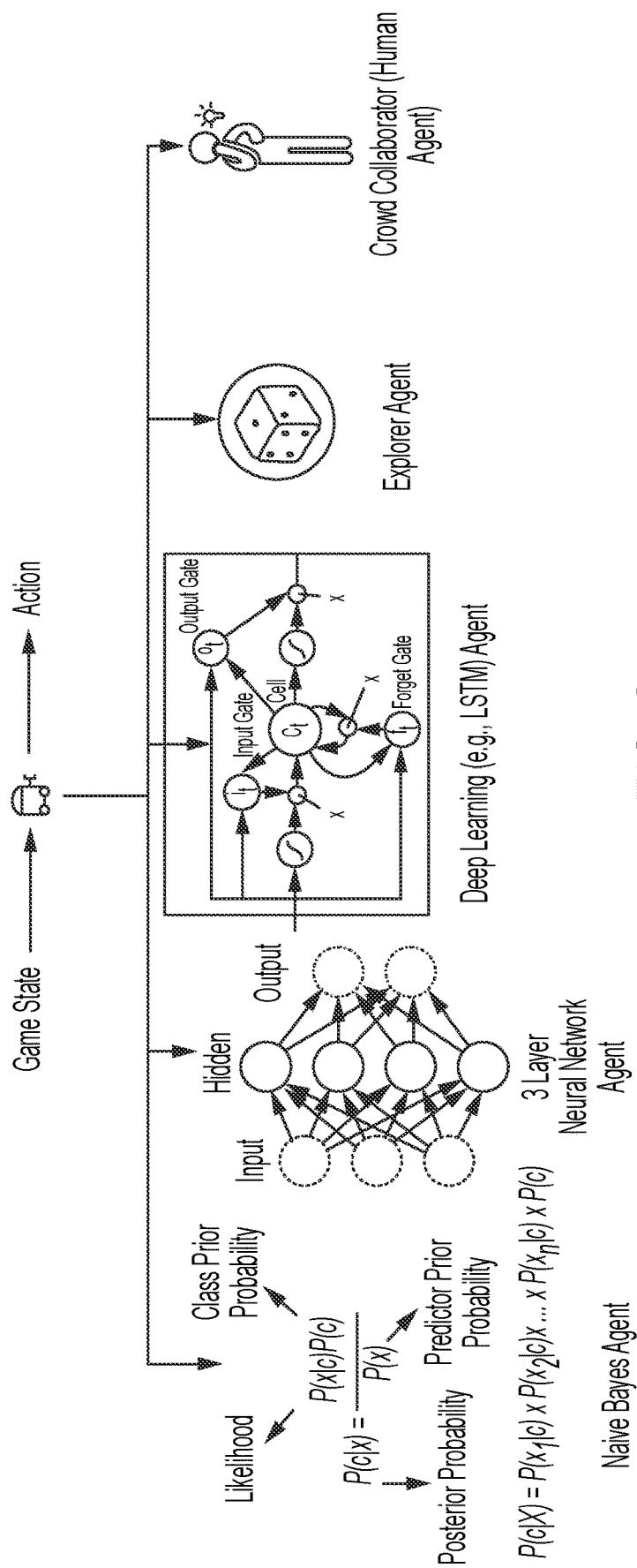
FIG. 2 illustrates the various types of agents that can be used in the learning architecture of the present invention.

FIG. 2 illustrates the various types of agents—i.e., the types of algorithms the agents may use for generating their actions—in the learning architecture of the present invention. As shown, in FIG. 2, the various agent types may include agents based on (i) a naïve Bayesian model, (ii) a 3-layer neural network, (iii) deep learning (DL), (iv) an explorer (discussed below), and (v) a human agent (e.g., a "crowd collaborator"). According to one embodiment, all agent types may be trained simultaneously. At run time, a model selection policy may be used to select the appropriate agent or model for the immediate context, based on performance data.

Figure 3:
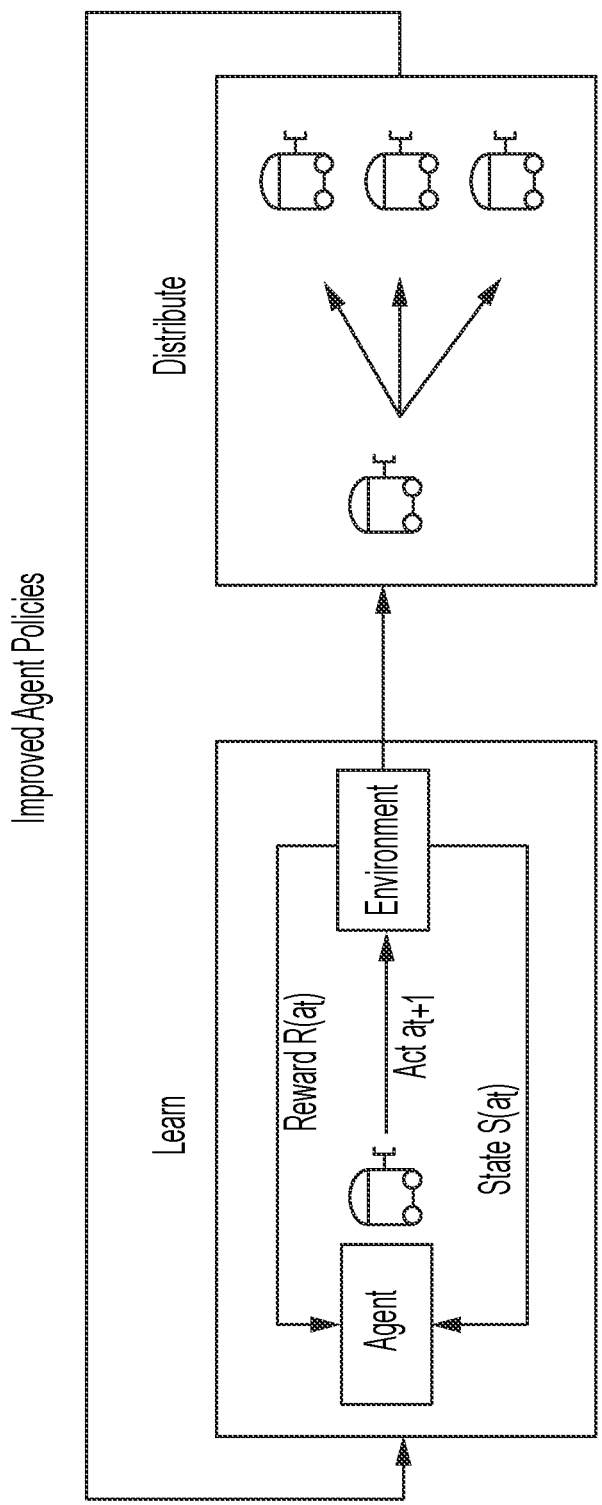
FIG. 3 illustrates the learning and adaptation phases in the RL framework of the present invention.

FIG. 3 illustrates the learning and adaptation phases in the RL framework of the present invention. As shown in FIG. 3, during the training or "Learn" phase, the work flow of FIG. 1 is exercised for a "game". During the "Distribute" phase, the results of the game are then used to improve the policy of each agent according to its ML model.

Tables 1 and 2 below provide the game states, the predictions and the rewards for an "Explorer" agent and an AI agent, respectively, during the "Learn" phase of an illustrative game under the RL framework of the present invention. In this example, the players compete to label the utterance 'I want to cancel my order' to one of two intents: "order cancellation," or "order status." The goal is to train the players to label the utterance "order cancellation." The Explorer agent has a policy $\pi_e$ that is random in nature. That is, given any current game state $s_t$, the Explorer agent provides its current bid according a randomly generated probability distribution of possible intents. In contrast, the AI agent has a policy $\pi_a$ is determined by a neural network. That is, the AI agent feeds current state $s_t$ into a neural network to obtain its current bid across the intents.

Initially, i.e., during a bootstrapping phase of the game, the Explorer agent plays a game repeatedly until a convergence in the probability distribution of its policy $\pi_e$ is realized. Meanwhile, the AI agent observes the game of the Explorer agent to iteratively learn by adapting its neural network to maximize its rewards.

Thereafter, the Explorer agent makes a prediction (i.e. provide a bid on the intents) based on the current game state $s_t$. Likewise, the AI agent plays the game in parallel. The environment element keeps in its memory the cumulative rewards provided in the games to the two agents. When the Explorer agent outperforms the AI agent, the policy $\pi_a$ of the AI agent is updated according to the predictions placed by the explorer agent in that game play. For example, as shown in Table 1, the Explorer agent obtained a cumulative reward of +2.2, thus outperforming the AI agent, which obtained a cumulative reward −1.8, as shown in Table 2. One way to update policy $\pi_a$ of the AI agent is to replicate the actions of the Explorer agent for game states $s_4$, $s_5$ and $s_6$, as the current rewards obtained in those states by the Explorer agent were greater than those obtained by the AI agent. The updated AI agent may replay the same game until its performance converges.

TABLE 1

| | Game state | | Actions | | |
|---|---|---|---|---|---|
| Game Steps | Game history (universal sentence encodings) | Current word (one-hot encoding) | Bidding on Intent 1 (correct intent) | Bidding on Intent 2 | Reward |
| 1 | NULL | 'I' | 0.4 | 0.6 | 1*0.4 − 1*0.6 = −0.2 |
| 2 | 'I' | 'want' | 0.5 | 0.5 | 1*0.5 − 1*0.5 = 0 |
| 3 | 'I want' | 'to' | 0.6 | 0.4 | 1*0.6 − 1*0.4 = +0.2 |
| 4 | 'I want to' | 'cancel' | 0.9 | 0.1 | 1*0.9 − 1*0.1 = +0.8 |
| 5 | 'I want to cancel' | 'my' | 0.8 | 0.2 | 1*0.8 − 1*0.2 = +0.6 |
| 6 | 'I want to cancel my' | 'order' | 0.9 | 0.1 | 1*0.9 − 1*0.1 = +0.8 |
| | Cumulative reward earned by the agent | | | | +2.2 |

TABLE 2

| Game steps | Game state | | Actions | | Reward |
| --- | --- | --- | --- | --- | --- |
| | Game history (universal sentence encodings) | Current word (one-hot encoding) | Bidding on Intent 1 (correct intent) | Bidding on Intent 2 | |
| 1 | NULL | 'I' | 0.4 | 0.6 | 1*0.4 − 1*0.6 = −0.2 |
| 2 | 'I' | 'want' | 0.5 | 0.5 | 1*0.5 − 1*0.5 = 0 |
| 3 | 'I want' | 'to' | 0.6 | 0.4 | 1*0.6 − 1*0.4 = 0.2 |
| 4 | 'I want to' | 'cancel' | 0.3 | 0.7 | 1*03 − 1*0.7 = −0.4 |
| 5 | 'I want to cancel' | 'my' | 0.2 | 0.8 | 1*0.2 − 1*0.8 = −0.6 |
| 6 | 'I want to cancel my' | 'order' | 0.1 | 0.9 | 1*0.1 − 1*0.9 = −0.8 |
| | Cumulative reward earned by the agent | | | | −1.8 |

The inventors tested different data sets of user queries on an RL framework according to a method of the present invention. The results attained by an AI agent on these different data sets of user queries are summarized in Table 3:

TABLE 3

| Datasets | No. of intents | No. of user queries | Training Accuracy (%) | Testing Accuracy (%) |
| --- | --- | --- | --- | --- |
| Dataset A (Telecom) | 10 | ~500 | ~93% | ~80% |
| Dataset B (Retail) | 14 | ~650 | ~94% | ~84% |
| Dataset C (Telecom) | 9 | ~557 | ~84% | ~72% |
| Dataset D (Telecom) | 3 | ~479 | ~97% | ~96% |

As shown in Table 3, a high accuracy is obtained by the AI agent observing the Explorer agent over multiple iterations. The AI agent attained accuracies above 80% for data sets that concern approximately 10 intents. In this example, the AI agent is neural network-based. The inventors also observed that, relative to the AI agent, while a DL-based agent requires more iterations to converge, it achieves a higher test accuracy over time.

Figure 4:
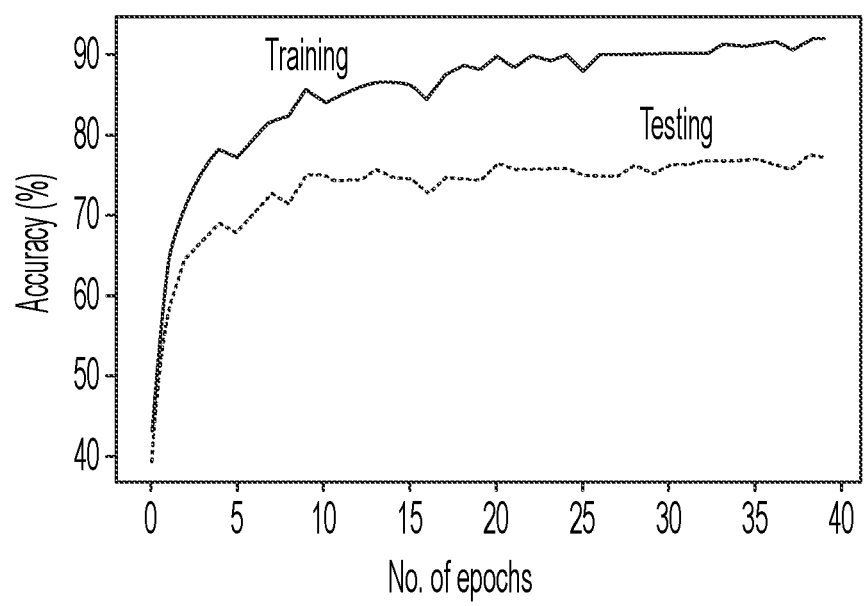
FIG. 4 shows the performance of the AI agent on a telecom user intents dataset (with 10 possible intents and about 500 unique user queries), using an RL framework of the present invention.

FIG. 4 shows the performance of the AI agent on a telecom user intents dataset (with 10 possible intents and about 500 unique user queries), using an RL framework of the present invention. FIG. 4 also shows that the Explorer agent bootstrap the AI agent very efficiently (see, the initial sharp rise in accuracy). Over time, progressively less incremental improvements are achieved as the AI agent begins to outperform the Explorer agent, which is reflected in decrease in feed-backs from the Explorer agent. A human agent may further enhance the training accuracy by providing input based on the human agent's ability to recognize nuances in specific states.

The RL framework of the present invention identifies both the phrase of a sentence describing a user intent and the context around that particular user intent. The RL framework may be further enhanced by intent embedding and linking an embedded intent to a specific well-defined user intent. Intent embedding has important applications in NLP, as each dimension of embedding informs an automated response builder how to respond to a user. For example, a successful embedding should result in the same cosine distance in a "refund" application, between a broken product and a defective product, as in a "replace" application, between a broken product and a defective product. Such user intent embeddings allow very personalized responses to be created for each user. For example, where dimensions representing a broken product inform the AI agent to be apologetic and to provide refund instructions.

The above detailed description is provided to illustrate specific embodiments of the present invention and should not be taken as limiting. Numerous variations and modifications within the scope of the present invention are possible. The present invention is set forth in the accompanying claims.

The invention claimed is:

1. A system for training machine agents to determine a user intent expressed in a document, comprising:
   a plurality of agents, wherein each agent is configured to (i) provide, upon receiving a current state and a current token, the token being one of a plurality of portions extracted from the document, a current prediction of the user intent based on a policy that acts on the current state and the current token, (ii) receive a current metric in response to providing the current prediction, and (iii) modify the policy based on one or more of the current metrics already received; and
   an environment element that extracts the tokens from the document, wherein the environment element is configured to (i) determine a next state and a next token from the extracted tokens; (ii) provide to each agent the next state as the current state and the next token as the current token, (iii) from each of the agents, receive that agent's current prediction of the user intent, and (iv) to each of the agents, provide the current metric to that agent based on comparing that agent's current prediction against a predetermined intent, and wherein the environment element determines each next state, other than an initial state, based on the current predictions of the agents, one or one or more of the current states and all the current tokens already provided to the agents.

2. The system of claim 1, wherein each current prediction is expressed as a confidence vector.

3. The system of claim 1, wherein each agent modifies its policy according to a cumulative reward, the cumulative reward being a sum of the current metrics then received by that agent, and wherein that agent modifies its policy based on increasing the cumulative reward.

4. The system of claim 3 wherein, in modifying its policy, each agent takes into consideration current metrics received by other agents.

5. The system of claim 1, wherein the policies of the agents are each based on a different machine learning technique.

6. The system of claim 5, wherein the machine learning technique is based on one or more of: (i) a naïve Bayesian model, (ii) a 3-layer neural network, (iii) deep learning (DL), (iv) an explorer, and (v) a human agent.

7. A method for training machine agents to determine a user intent expressed in a document using a plurality of agents, the method comprising:
   (i) extracting the tokens from the document and assigning an initial state as a current state and selecting one of the tokens as a current token;
   (ii) providing to each of the agents the current state and the current token;
   (iii) receiving a current prediction of the user intent from each agent, wherein each agent provides the current prediction based on a policy that acts on the current state and the current token;
   (iv) sending to each agent a current metric based on comparing that agent's current prediction against a predetermined intent;
   (v) unless all extracted tokens have been selected, (a) determining a next state based on one or one or more of the current states and all the current tokens already provided to the agents, (b) selecting a next token from the extracted tokens, (c) assigning the next state as the current state and the next token as the current token; and (d) repeating steps (ii) through (v); and
   (vi) causing each agent to modify its policy based on one or more of the current metrics sent to the agent.

8. The method of claim 7, wherein each current prediction is expressed as a confidence vector.

9. The method of claim 7, wherein each agent modifies its policy according to a cumulative reward, the cumulative reward being a sum of the current metrics then received by that agent, and wherein that agent modifies its policy based on increasing the cumulative reward.

10. The method of claim 9 wherein, in modifying its policy, each agent takes into consideration current metrics received by other agents.

11. The method of claim 7, wherein the policies of the agents are each based on a different machine learning technique.

12. The method of claim 11, wherein the machine learning technique is based on one or more of: (i) a naïve Bayesian model, (ii) a 3-layer neural network, (iii) deep learning (DL), (iv) an explorer, and (v) a human agent.

* * * * *